Nov. 29, 1966   T. A. NORTON   3,288,522
DOCK BOARD ASSEMBLY FOR A VEHICLE
Filed March 1, 1965
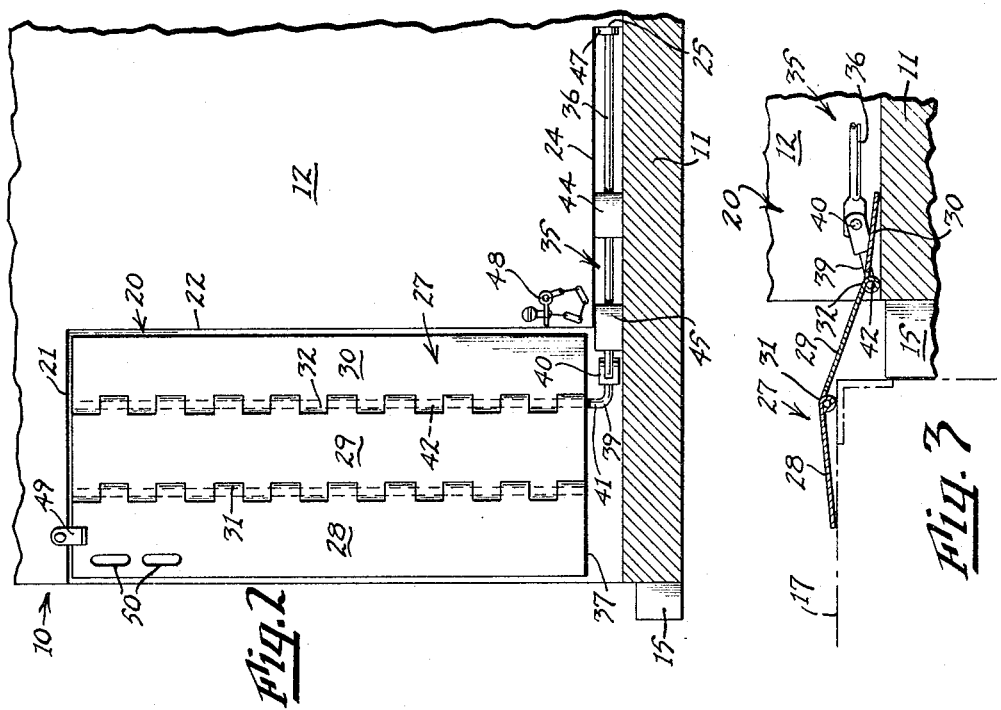
INVENTOR:
THEODORE A. NORTON
BY Harrington A. Lackey
ATTORNEY United States Patent Office 3,288,522
Patented Nov. 29, 1966

3,288,522
DOCK BOARD ASSEMBLY FOR A VEHICLE
Theodore A. Norton, 1018 Downey Drive,
Nashville, Tenn.
Filed Mar. 1, 1965, Ser. No. 436,167
9 Claims. (Cl. 296—61)

This invention relates to a dock board assembly for a vehicle, and more particularly to a dock board mounted on a vehicle for movement between inoperative and operative positions.

Heretofore, dock boards have consisted of heavy rectangular metal plates or wooden boards, usually steel plates. These steel plates usually lie around loose on a loading dock until they are needed for unloading a vehicle, such as a trailer or truck. The dock board must then be man-handled into operative loading position spanning the distance between the bed or floor of the vehicle and the dock so that cargo may be moved over the dock board either into or out of the vehicle. Such man-handling usually consists of outright lifting and carrying the dock board by two or more men, or by walking the board on its edge, to the loading position. Another means which has been used for moving the plate into position is a fork-lift truck.

Another disadvantage of the conventional plate-type dock board is its availability. If there are only four dock boards on the dock, and six vehicles are ready to unload, then obviously there will be a delay in unloading two of the vehicles until the dock boards become available. Moreover, because the dock boards are loose, they are subject to being misplaced, removed or stolen, to make the problem of availability even more acute.

Although it might be possible to carry a conventional type dock board in each vehicle, the problem of man-handling is still the same, and the dock board would occupy valuable space in the vehicle which could otherwise be employed for the payload.

It is therefore an object of this invention to overcome the above disadvantages by providing a dock board which may be mounted on each vehicle, manipulated with a minimum of time and energy, and which may be stored in the vehicle without occupying any of the payload storage space.

Another object of this invention is to provide a dock board having means for mounting the dock board in the wall of the vehicle in inoperative position, and for moving the dock board rearwardly and pivotally inwardly to an operative position to span the space between the vehicle and the dock.

Another object of this invention is to provide a dock board mounted in a vehicle for movement between an operative and an inoperative position, in which the dock board comprises articulated leaves or sections for accommodation of the dock board to docks of vehicles of different heights.

A further object of this invention is to provide a dock board for a vehicle, a cavity in the side wall of the vehicle for receiving the dock board in an upright, inoperative position and mounting means for slidably supporting the dock board for forward and rearward movement relative to the cavity and for pivotal movement between an upright position and a horizontal operative position extending from the rear of the vehicle.

Further objects and advantages of the invention will be apparent from the following descriptions taken in conjunction with the drawings, wherein:

FIG. 1 is a perspective view of the invention in operative position spanning the distance between the rear end of a vehicle and a dock;

FIG. 2 is a fragmentary sectional elevation taken through the floor of the vehicle and showing the dock board in inoperative position; and FIG. 3 is a section taken along the line 3—3 of FIG. 1.

Referring now to the drawings in more detail, FIG. 1 discloses the open rear end of a vehicle, such as a trailer 10, having a bed or floor 11, a left side wall 12, a right side wall 13 and rear bumpers such as 15. The vehicle 10 is shown in FIG. 1 in operative position with the bumpers 15 engaging a loading dock 17, for either loading or unloading.

In accordance with this invention, either side wall, such as the disclosed left side wall 12 in the drawings, is provided with a rectangular cavity 20 opening into the interior of the trailer vehicle 10 and through the rear edge of the side wall 12. Thus, the cavity 20 is provided with a top edge wall 21, a front edge wall 22, and is bounded on its bottom by the floor 11.

Extending forwardly from the bottom portion of the front edge wall 22 in the side wall 12 is an elongated slot 24. The slot 24 has substantially the same thickness as the cavity 20, opens rearwardly into the cavity 20, but preferably has a forward abutment wall 25.

Adapted to be received in the cavity 20 is the rectangular dock board 27, which is articulated in three sections or leaves 28, 29 and 30. The opposing longitudinal edges of the rear leaf 28 and the intermediate leaf 29 are pivotally joined by hinge means, such as the piano hinge 31. In a similar manner, the opposing longitudinal edges of the intermediate leaf 29 and the front leaf 30 are pivotally joined by hinge means, such as the piano hinge 32. The piano hinges 31 and 32 permit substantially free pivotal movement of the respective leaves 28, 29 and 30, so that each leaf may pivot in either direction away from the plane of the inoperative position of the dock board 27 when the leaves are not constrained by the cavity 20.

An operative rod member 35 includes an elongated straight circular rod 36 which extends forwardly of the dock board 27 and substantially parallel to the lateral edge 37 of the dock board 27. Since the dock board 27 includes a plurality of articulated leaves 28, 29 and 30, the lateral edge 37 of the dock board will be defined as the co-extensive lateral edges of all the leaves when lying in the same plane.

The rear portion of the rod member 35 comprises an angular or bent rod 39. The bent rod 39 preferably forms an angle of approximately 90°, and its forward end may be connected to the rear portion of the straight rod 36 by means of a hinge joint such as 40. The pivotal axis of the hinge 40 is parallel to the axes of the piano hinges 31 and 32. Although the opposite end or lateral leg 41 of angular rod 39 may be fixed in any convenient manner to the lateral edge 37 of the dock board 27, the leg 41 is shown as an extension of the hinge pin 42, of the piano hinge 32.

A front bearing block 44 and a rear bearing block 45 are mounted on the floor 11 and longitudinally spaced axially of the slot 24 to rotatably and slidably receive the rod portion 36. The front of the rod portion 36 forms a stop member 47, which is adapted to engage the abutment wall 25 of the slot 24 when the dock board 27 is in its extreme forward inoperative position, as disclosed in FIG. 2. Moreover, as best disclosed in FIG. 1, the front bearing block 44 is spaced from the abutment wall 25 a sufficient distance to permit the stop member 47 to abut the front bearing block 44 when the dock board 27 is in its extreme rearward position. To lock the dock board in the extreme rearward position, a locking pin 48, chained to the side wall 12, may be inserted into a registering aperture in the rod 36, as disclosed in FIG. 1.

A pivotal latch 49, or any other convenient retaining means is mounted on the side wall 12 to retain the dock board 27 in its upright inoperative position.

Hand holes 50 may be provided in the rear leaf 28 adjacent its rear edge to facilitate manipulating the dock board 27 between its operative and inoperative position.

The operation of the invention is as follows:

In the inoperative position as disclosed in FIG. 2, the dock board 27 is received in an upright position, fully contained within the cavity 20, supported by the rod member 35 in the bearings 44 and 45, and retained in posiiton by the pivotal latch 49. As previously described the rod member 35 is in its extreme forward position within the slot 24 so that the stop member 47 engages the front abutment wall 25. It would also be possible, but not as desirable, to extend the length of the slot 24 and eliminate the front abutment wall 25, since the front edge of the dock board 27 would abut against the front edge wall 22 of the cavity 20.

In its inoperative position, the thickness of the cavity 20 is preferably equal to or slightly greater than the thickness of the dock board 27, so that no portion of the dock board 27 will protrude into the interior of the vehicle trailer 10 and occupy any space available for the payload. In effect, the dock board 27 in its inoperative position forms a part of side wall 12, and in this position will always be available for loading and unloading that particular vehicle.

When it is desired to load or unload the contents of the vehicle relative to a dock 17, the pivotal latch 49 is moved from its latched position in FIG. 2 to its unlatched position in FIG. 1. The operator then grasps the hand holes 50 and pulls the dock board 27 rearwardly in its upright position. This movement causes the straight rod 36 to slide rearwardly through bearing blocks 44 and 45. However, when the stop member 47 engages the front bearing 44, the dock board 27 cannot be moved rearwardly any further. Thus, the spacing of the stop member 47 from the front bearing 44 must be such as to permit the necessary range of rearward movement for various unloading positions.

After the dock board 27 has been moved to its desired rearward position, it is then lowered inwardly about the pivotal axis of the rod 36 until it is in its operative position spanning the distance between the vehicle 10 and the dock 17, as best disclosed in FIGS. 1 and 3. In the operative position, the front leaf 30 is preferably fully supported on the floor 11, so that the intermediate leaf 29 fully spans the distance between the rear end of the floor 11 and the dock 17, and the rear leaf 28 is supported upon the dock 17. As best disclosed in FIG. 3, the spanned distance is approximately equal to the thickness, or front-to-rear dimension, of the bumper 15. The articulated construction of the dock board 27 automatically adjusts itself to minor differences in height between the vehicle floor 11 and the dock 17. The range of such adjustability is limited by the widths of the leaves and particularly the intermediate leaf 29. As an additional aid to the height adjustment of the dock board 27, the hinge joint 40 is provided in the rod member 35.

After the loading or unloading operation, the dock board 27 is returned to its inoperative position by grasping the hand holes 50, pivoting the dock board 27 upwardly about the axis of the rod 36 until the dock board 27 is upright, and then pushing the dock board forwardly until it is fully received in cavity 20 in the inoperative position disclosed in FIG. 2. Since the axis of the hinge 40 is parallel to piano hinges 31 and 32, there will be no pivotal movement of the dock board 27 in its upright position relative to the cavity 20. When the dock board 27 is fully received in cavity 20, the pivotal latch 49 is then returned to its latched position disclosed in FIG. 2, and the vehicle is ready to move to its next destination, carrying the dock board 27 with it.

The dock board 27 may be any type of strong sheet material, preferably steel or magnesium, and is preferably provided with a diamond patterned surface to provide better traction. Depending upon the weight of the material employed in the dock board 27, the material and dimensions of the rod member 35 must conform accordingly to provide sufficient strength for supporting the dock board 27 in its various positions.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A dock board assembly for the rear end of a vehicle having a floor and a side wall, comprising:
    (a) a dock board having first, second and third leaves of substantially equal length,
    (b) first hinge means for pivotally joining opposing longitudinal edges of said first and second leaves,
    (c) second hinge means for pivotally joining opposing longitudinal edges of said second and third leaves,
    (d) a cavity in said vehicle side wall opening toward the rear and inwardly toward said floor, said cavity being adapted to receive said dock board in an upright, inoperative position,
    (e) a rod member fixed to said dock board to extend forwardly parallel to and adjacent one lateral edge of said dock board, and
    (f) bearing means fixed to said vehicle to rotatably and slidably receive said rod member, so that said dock board may be moved rearwardly and pivoted inwardly to an operative position supported by said floor.

2. The invention according to claim 1 in which means are provided for retaining said dock board in said cavity in said inoperative position.

3. The invention according to claim 1 further comprising hand holes formed in said rear leaf adjacent its rear longitudinal edge.

4. A dock board assembly for the rear end of a vehicle having a floor and a side wall, comprising:
    (a) a dock board having rear, intermediate and front leaves of substantially equal lengths,
    (b) first hinge means for pivotally joining opposing longitudinal edges of said rear and intermediate leaves,
    (c) second hinge means for pivotally joining opposing longitudinal edges of said intermediate and front leaves,
    (d) a cavity in said vehicle wall opening toward the rear and inwardly toward said floor, said cavity being adapted to receive said dock board in an upright inoperative position,
    (e) an elongated slot formed in said side wall, said slot opening into the forward and bottom portion of said cavity, and extending forwardly thereof,
    (f) a rod member fixed to said dock board and extending forwardly parallel to and adjacent one lateral edge of said dock board into said slot, and
    (g) bearings fixed to said vehicle coaxially of said slot to rotatably and slidably receive said rod member so that said dock board may be moved rearwardly and pivoted inwardly to an operative position supported by said floor.

5. The invention according to claim 4 in which the forward end of said slot comprises an abutment, and the forward end of said rod member comprises a stop member, said stop member being adapted to engage said abutment when said dock board is in its inoperative position, and said stop member being adapted to engage the forwardmost bearing block when said dock board has been moved to its extreme rearward operative position.

6. The invention according to claim 4 in which said rod member comprises a straight circular rod having a rear end bent inward and fixed to said dock board.

7. The invention according to claim 4 in which said rod member comprises a hinged joint adjacent said one lateral edge and rearwardly of the rearmost bearing block, the pivotal axis of said hinge joint being parallel to the pivotal axes of said hinge means.

8. The invention according to claim 4 in which the widths of said leaves are such as to permit said intermediate leaf to span the distance between the rear end of said floor and a dock adjacent the rear of said vehicle when said front leaf is supported on said floor and said rear leaf is supported on said dock.

9. A dock board assembly for the rear end of a vehicle having a floor and a side wall, comprising:
   (a) a dock board having a length less than the width of said floor, and a lateral edge,
   (b) a cavity in said vehicle side wall opening toward the rear and inwardly toward said floor, said cavity being adapted to receive said dock board in an upright, inoperative position,
   (c) a rod member fixed to said dock board to extend forwardly and adjacent said lateral edge, and
   (d) bearing means fixed to said vehicle to rotatably and slidably receive said rod member, so that said dock board may be moved rearwardly and pivoted inwardly to an operative position supported by said floor.

References Cited by the Applicant

UNITED STATES PATENTS

| | | |
|---|---|---|
| 456,601 | 7/1891 | Sherwin. |
| 1,207,902 | 12/1916 | Haberman. |
| 2,718,431 | 9/1955 | Pietroroia. |
| 2,727,781 | 12/1955 | D'Eath. |
| 2,900,094 | 8/1959 | Ferguson. |
| 3,003,167 | 10/1961 | Smith. |
| 3,004,500 | 10/1961 | Johnson. |

BENJAMIN HERSH, *Primary Examiner.*

P. GOODMAN, *Assistant Examiner.*